T. C. CLARK.
Grain-Drill.

No. 207,503. Patented Aug. 27, 1878.

Witnesses:
P. C. Dietrich
Frank K. Duffy

Inventor:
Thomas Craven Clark
per C. H. Watson & Co. Attorneys.

UNITED STATES PATENT OFFICE.

THOMAS C. CLARK, OF RUSSELLVILLE, KENTUCKY.

IMPROVEMENT IN GRAIN-DRILLS.

Specification forming part of Letters Patent No. 207,503, dated August 27, 1878; application filed August 7, 1878.

*To all whom it may concern:*

Be it known that I, THOMAS CRAVEN CLARK, of Russellville, in the county of Logan and State of Kentucky, have invented certain new and useful Improvements in Grain-Drills; and I do hereby declare that the following is a full, clear, and exact description thereof, which will enable others skilled in the art to which it appertains to make and use the same, reference being had to the accompanying drawings, and to the letters of reference marked thereon, which form a part of this specification.

This invention relates to grain-drills; and it consists in the construction and combination of devices for adjusting the hoes of the drill, as will be hereinafter more fully set forth.

Figure 1:
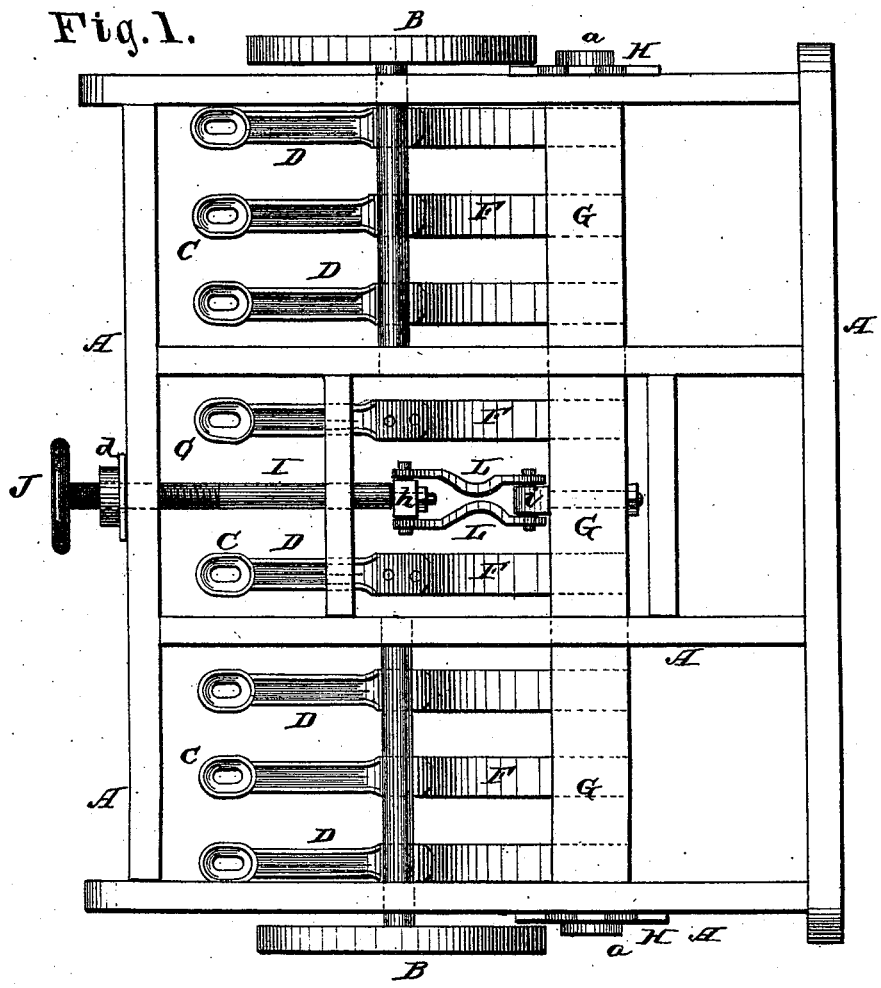
Figure 2:
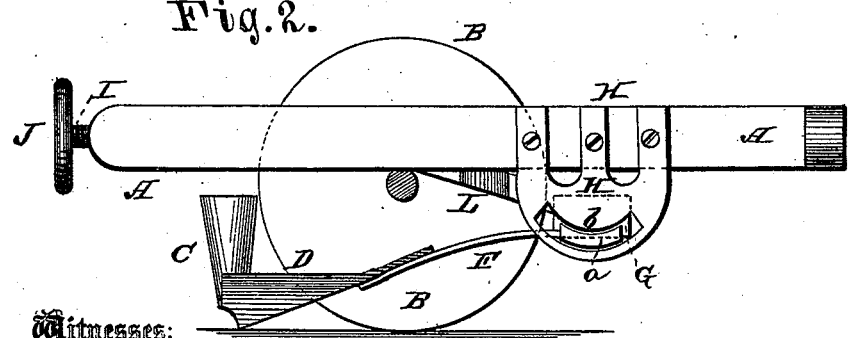

In the annexed drawing, to which reference is made, and which fully illustrates this invention, Figure 1 is a plan view, and Fig. 2 a side elevation, of the invention.

A represents a rectangular frame of any suitable dimensions mounted upon two wheels, B B. C C represent the hoes of the grain-drill, the lower ends of which are secured or made fast in the colters D D, said colters being riveted or otherwise attached to flat springs F F. The front ends of these springs F F are bolted or otherwise firmly secured to a cross-bar, G, which is at each end provided with a metal bar, $a$, projecting beyond the end of the bar G, and the projecting end of each metal bar is made concavo-convex in form, as shown. These projecting ends of the metal bars $a$ $a$ are inserted in curved slots $b$ in metallic hangers H H, secured to and depending from the main frame A. The bar G is thus supported in the hangers H, and by being moved backward or forward in the slots $b$ the hoes are thrown out of or into the ground, as desired. On the rear cross-bar of the main frame is secured a nut, $d$, through which is passed a screw-shaft, I, having a hand-wheel, J, on its rear end. The front portion of the shaft I has no threads, and is passed loosely through a cross-bar in the frame, and the extreme front end of said shaft is swiveled in a bearing, $h$, between the ends of two bars or rods, L L, the other ends of which are pivoted to a stud, $i$, fastened in the rear edge of the bar G.

It will readily be seen that by turning the hand-wheel J the screw-shaft I is moved forward or backward, according to the direction in which the wheel is turned, and the bar G is thereby turned in its bearings, so as to raise or lower the hoes, as desired.

The screw-shaft I, with its hand-wheel, may be arranged in a vertical position, and the connection made accordingly, if desired.

Having thus fully described the invention, what is claimed as new, and desired to be secured by Letters Patent, is—

1. The bar G, having the springs F, colters D, and hoes C attached thereto, and provided with the projecting concavo-convex bars $a$ at its ends, in combination with the hangers H, having curved slots $b$, and a mechanism for adjusting the bar G, as set forth.

2. In combination with the bar G, supported in the hangers H, and having the hoes C connected thereto, the nut $d$, screw-shaft I, swiveled bearing $h$, arms L, and stud $i$, all substantially as and for the purposes herein set forth.

In testimony that I claim the foregoing as my own I have hereto affixed my signature in presence of two witnesses.

THOMAS CRAVEN CLARK.

Witnesses:
 OSWIN A. CLARK,
 J. H. DEMPSY.